(12) United States Patent
Eickhoff et al.

(10) Patent No.: US 7,455,829 B2
(45) Date of Patent: Nov. 25, 2008

(54) LOW TEMPERATURE HYDROGEN GENERATOR

(75) Inventors: Steven J. Eickhoff, Plymouth, MN (US); R. Andrew Wood, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 339 days.

(21) Appl. No.: 11/209,591

(22) Filed: Aug. 22, 2005

(65) Prior Publication Data

US 2007/0041897 A1    Feb. 22, 2007

Related U.S. Application Data

(60) Provisional application No. 60/698,457, filed on Jul. 12, 2005.

(51) Int. Cl.
    *C01B 3/06*    (2006.01)
(52) U.S. Cl. .................. 423/658.2; 48/61; 423/657
(58) Field of Classification Search ............. 423/648.1, 423/657, 658.2; 48/61
    See application file for complete search history.

(56) References Cited

U.S. PATENT DOCUMENTS

| | | | |
|---|---|---|---|
| 2,935,382 A * | 5/1960 | Osborn et al. ............. 423/657 |
| 3,133,837 A | 5/1964 | Eidensohn | |
| 3,931,395 A * | 1/1976 | Beckert et al. ........... 423/648.1 |
| 4,048,385 A | 9/1977 | Regnaut | |
| 4,476,196 A | 10/1984 | Poeppel et al. | |
| 4,476,197 A | 10/1984 | Herceg | |
| 4,596,748 A | 6/1986 | Katz et al. | |
| 4,659,559 A | 4/1987 | Struthers | |
| 4,826,741 A | 5/1989 | Aldhart et al. | |
| 4,857,420 A | 8/1989 | Maricle et al. | |
| 4,876,163 A | 10/1989 | Reichner | |
| 4,910,100 A | 3/1990 | Nakanishi et al. | |
| 5,248,125 A | 9/1993 | Fritch et al. | |
| 5,298,341 A | 3/1994 | Khandkar et al. | |
| 5,372,617 A | 12/1994 | Kerrebrock et al. | |
| 5,449,697 A | 9/1995 | Noaki et al. | |
| 5,789,100 A | 8/1998 | Burroughs et al. | |
| 5,804,329 A | 9/1998 | Amendola | |
| 5,836,750 A | 11/1998 | Cabuz | |
| 5,849,046 A | 12/1998 | Bailey | |
| 5,851,689 A | 12/1998 | Chen | |
| 5,861,221 A | 1/1999 | Ledjeff et al. | |
| 5,948,558 A | 9/1999 | Amendola | |
| 5,974,235 A | 10/1999 | Nunally et al. | |
| 6,052,124 A | 4/2000 | Stein et al. | |
| 6,054,234 A | 4/2000 | Weiss et al. | |
| 6,093,501 A | 7/2000 | Werth | |
| 6,250,078 B1 | 6/2001 | Amendola et al. | |
| 6,280,869 B1 | 8/2001 | Chen | |
| 6,307,605 B1 | 10/2001 | Bailey | |
| 6,326,097 B1 | 12/2001 | Hockaday | |
| 6,428,680 B1 | 8/2002 | Kriechauf | |
| 6,433,129 B1 | 8/2002 | Amendola et al. | |
| 6,434,278 B1 | 8/2002 | Hashimoto | |
| 6,468,694 B1 | 10/2002 | Amendola | |
| 6,483,275 B1 | 11/2002 | Nebrigic et al. | |
| 6,497,973 B1 | 12/2002 | Amendola | |
| 6,506,510 B1 | 1/2003 | Sioui et al. | |
| 6,524,542 B2 | 2/2003 | Amendola et al. | |
| 6,534,033 B1 | 3/2003 | Amendola et al. | |
| 6,541,149 B1 | 4/2003 | Maynard et al. | |
| 6,544,679 B1 | 4/2003 | Petillo et al. | |
| 6,586,563 B1 | 7/2003 | Ortega et al. | |
| 6,620,542 B2 | 9/2003 | Pan | |
| 6,670,444 B2 | 12/2003 | Amendola et al. | |
| 6,683,025 B2 | 1/2004 | Amendola et al. | |
| 6,706,909 B1 | 3/2004 | Snover et al. | |
| 6,728,422 B1 | 4/2004 | Weiss | |
| 6,760,488 B1 | 7/2004 | Moura et al. | |
| 6,932,847 B2 | 8/2005 | Amendola et al. | |
| 6,939,529 B2 | 9/2005 | Strizki et al. | |
| 6,950,030 B2 | 9/2005 | Kovarik et al. | |
| 6,977,123 B1 | 12/2005 | Burroughs et al. | |
| 7,001,681 B2 | 2/2006 | Wood | |
| 7,019,105 B2 | 3/2006 | Amendola et al. | |
| 7,073,368 B2 | 7/2006 | Wood et al. | |
| 7,083,657 B2 | 8/2006 | Mohring et al. | |
| 7,105,033 B2 | 9/2006 | Strizki et al. | |

(Continued)

FOREIGN PATENT DOCUMENTS

DE    19734259    2/1999

(Continued)

OTHER PUBLICATIONS

Aiello et al., "Production of Hydrogen from Cheical Hydrides Via Hydrolysis with Steam," International Journal of Hydrogen Energy, vol. 24, pp. 1123-1130, 1999, no month.

(Continued)

*Primary Examiner*—Wayne Langel
(74) *Attorney, Agent, or Firm*—Kris T. Fredrick

(57) ABSTRACT

A hydrogen generator having a hydrogen generating reaction between a chemical hydride and vapor from a liquid having a freezing point below 0° C. The liquid is selected from alcohols such as ethanol and methanol used pure or diluted with distilled water, and distilled water that has had a non-reactive salt such as calcium chloride or magnesium chloride dissolved therein.

12 Claims, 1 Drawing Sheet

U.S. PATENT DOCUMENTS

| | | |
|---|---|---|
| 7,108,777 B2 | 9/2006 | Xu et al. |
| 2001/0012494 A1 | 8/2001 | Kreichauf |
| 2001/0028973 A1 | 10/2001 | Ong et al. |
| 2002/0068213 A1 | 6/2002 | Kaiser et al. |
| 2002/0177031 A1 | 11/2002 | Doshi et al. |
| 2003/0009942 A1 | 1/2003 | Amendola et al. |
| 2003/0044656 A1 | 3/2003 | Wood |
| 2003/0054215 A1 | 3/2003 | Doshi et al. |
| 2003/0091877 A1 | 5/2003 | Chen et al. |
| 2003/0157018 A1* | 8/2003 | Zaluski et al. ............ 423/648.1 |
| 2004/0009379 A1 | 1/2004 | Amendola et al. |
| 2004/0009392 A1 | 1/2004 | Petillo et al. |
| 2004/0011662 A1 | 1/2004 | Xu et al. |
| 2004/0033194 A1 | 2/2004 | Amendola et al. |
| 2004/0035054 A1 | 2/2004 | Mohring et al. |
| 2004/0047801 A1 | 3/2004 | Petillo et al. |
| 2004/0081615 A1* | 4/2004 | Brinkley, III ................. 423/657 |
| 2004/0120889 A1 | 6/2004 | Shah et al. |
| 2004/0148857 A1 | 8/2004 | Strizki et al. |
| 2004/0161646 A1 | 8/2004 | Rezachek et al. |
| 2004/0191152 A1 | 9/2004 | Amendola et al. |
| 2005/0132640 A1 | 6/2005 | Kelly et al. |
| 2005/0135996 A1 | 6/2005 | Ortega et al. |
| 2005/0142410 A1 | 6/2005 | Higashi et al. |
| 2005/0181245 A1 | 8/2005 | Bonne et al. |
| 2005/0238573 A1 | 10/2005 | Zhang et al. |
| 2005/0260461 A1 | 11/2005 | Wood et al. |
| 2005/0262924 A1 | 12/2005 | Wood et al. |
| 2005/0268555 A1 | 12/2005 | Amendola et al. |
| 2005/0276746 A1 | 12/2005 | Zhang et al. |
| 2006/0014059 A1 | 1/2006 | Wood |
| 2006/0021279 A1 | 2/2006 | Mohring et al. |
| 2006/0040152 A1 | 2/2006 | Wood |
| 2006/0102489 A1 | 5/2006 | Kelly |
| 2006/0102491 A1 | 5/2006 | Kelly et al. |
| 2006/0144701 A1 | 7/2006 | Kelly |
| 2007/0217994 A1* | 9/2007 | Amendola et al. ....... 423/648.1 |

FOREIGN PATENT DOCUMENTS

| | | |
|---|---|---|
| EP | 1351329 | 10/2003 |
| EP | 1496561 | 1/2005 |
| GB | 723180 | 2/1955 |
| JP | 57138782 | 8/1982 |
| JP | 60000066 | 1/1985 |
| JP | 4342439 | 11/1992 |
| JP | 9326259 | 12/1997 |
| WO | 0035032 | 6/2000 |
| WO | 0045457 | 8/2000 |
| WO | 0185606 | 11/2001 |
| WO | 03084866 | 10/2003 |
| WO | 2004025750 | 3/2004 |
| WO | 2004075375 | 9/2004 |

OTHER PUBLICATIONS

Amendola et al., "A Novel High Power Density Borohydride-Air Cell," Electromechanical Society Proceedings, vol. 98-15, pp. 47-54, Nov. 1, 1998.

Amendola et al., "A Safe Portable Hydrogen Gas Generator Using Aqueous Borohyfride Solution and Ru Catalyst," International Journal of Hydrogen Energy, Vo., 25, No. 10, pp. 969-975, 2000, no month.

Amendola et al., An Ultrasafe Hydrogen Generator: Aqueous, Alkaline Borohydride Solutions and Ru Calalyst, Journal of Power Sources, vol. 85, No. 2, pp. 186-189, 2000, no month.

Medioni et al., "Event Detection and Analysis from Video Streams," IEEE Transactions on Pattern Analysis and Machine Intelligence, vol. 23, No. 8, pp. 873-889, Aug. 2001.

Porikli et al., "Event Detection by Eigenvector Decomposition Using Object and Frame Features," IEEE, 10 pages, 2004, no month.

* cited by examiner

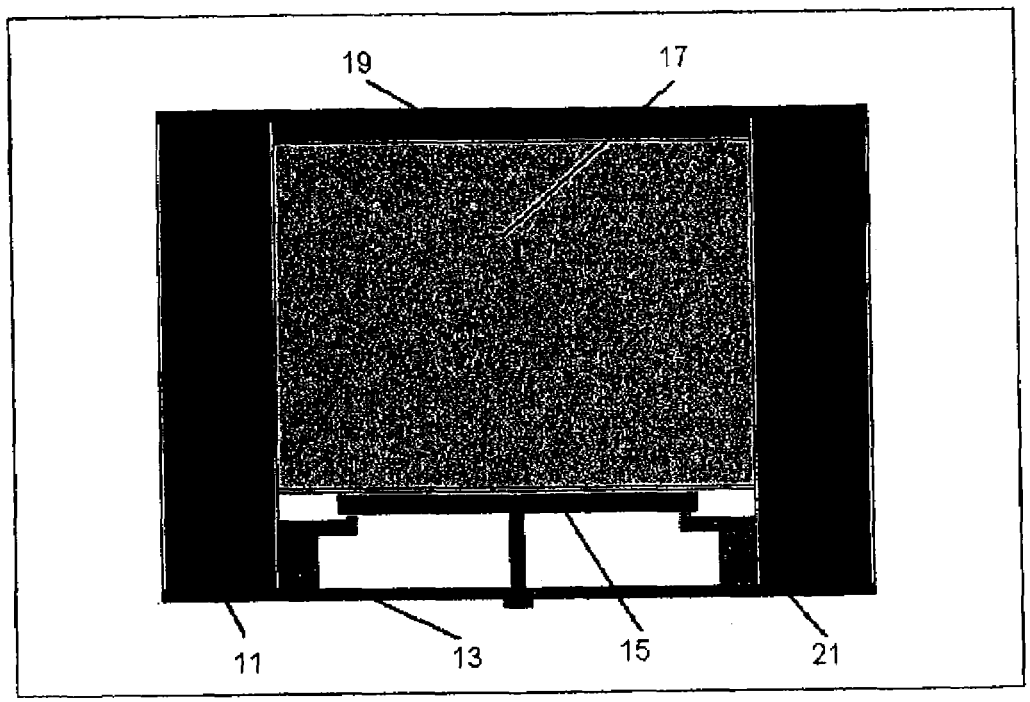
PRIOR ART

LOW TEMPERATURE HYDROGEN GENERATOR

This application claims the benefit of U.S. Provisional Patent Application Ser. No. 60/698457, filed Jul. 12, 2005.

FIELD OF THE INVENTION

The present invention relates to hydrogen generators. More particularly, the invention relates to hydrogen generators that operate at low ambient temperatures, such as those below the freezing point of water.

BACKGROUND OF THE INVENTION

Hydrogen holds a substantial promise as a plentiful, clean-burning fuel that may even replace gasoline. The advantage of reducing the amount of greenhouse gas will become more important with time. The combustion of hydrogen produces water.

There are a number of systems for the generation of hydrogen for a variety of purposes. Estimates suggest that more than nine million tons of hydrogen is produced annually. Hydrogen is generated by a chemical reaction between a reactive metal fuel such as aluminum, magnesium, or lithium, and alloys or hydrides of these and similar reactants, with an "oxidizer" such as hydrogen peroxide, Freon, sulfur hexafluoride, water, and others. Molten metals are also used as one of the reactants. Hydrogen generating materials have been investigated including LiH, $LiAlH_4$, $NH_3$ Al, Mg, $MgH_2$, and $LiBH_4$. These materials are often reacted with water to generate hydrogen.

In many cases the most economical and efficient hydrogen generators are those that react water vapor from store liquid water with a chemical hydride. The water is stored at ambient temperature and converted to water vapor for the reaction with the chemical hydride. The main problem with these hydrogen generators is that they cannot operate below 0° Celsius with frozen water or ice, without disrupting operation or risking damage to the generator due to expansion as the liquid water changes to a solid.

It would be of advantage in the art if hydrogen generators that use liquid water converted to water vapor and a chemical hydride could operate where the water is stored at temperatures below 0° Celsius.

Yet another advantage would be if such a hydrogen generator would retain the advantages of stored liquid water producing water vapor for reaction with a chemical hydride reaction to generate hydrogen without the concern for colder temperatures.

Other advantages will appear hereinafter.

SUMMARY OF THE INVENTION

It has now been discovered that the above and other advantages of the present invention may be obtained in the following manner. Specifically, the present invention provides a low temperature hydrogen generator that produces hydrogen at temperatures below the freezing point of water.

In its simplest form the present invention comprises a substitution of another liquid for water in the same hydrogen generator using the same hydride chemical reaction. The substitute liquid is selected from alcohols such as ethanol and methanol used pure or diluted with distilled water, and distilled water that has had a non-reactive salt such as calcium chloride or magnesium chloride dissolved therein. The stored liquid produces a gas vapor in the same manner as when pure distilled water is used.

BRIEF DESCRIPTION OF THE DRAWINGS

For a more complete understanding of the invention, reference is hereby made to the drawings, in which:

The Figure is a side elevational view in cross section of a hydrogen generator of the type in which the present invention may be used.

DETAILED DESCRIPTION OF THE PREFERRED EMBODIMENT

The present invention improves the operating range of hydrogen generators that use a chemical hydride and water vapor from stored distilled water reaction to produce hydrogen. The distilled water is replaced with a liquid that has a freezing point below 0° C., and preferably below 15° C. and more preferably below 30° C. The liquid is preferably an alcohol or distilled water having a non-hydride reacting salt dissolved therein.

The Figure illustrates a conventional hydrogen generator 10, with water chambers 11, a diaphragm 13, valve disc 15, powder chamber 17 and fuel cell assembly 19. In use, the water chamber 11 is exposed to ambient conditions and when the temperature drops below 0° C., the water will freeze, and thus it won't flow into the fuel cell assembly 19 for conversion into water vapor. The hydrogen generator also includes a membrane 21, made from Gore-Tex or another material that is impermeable to water but permeable to water vapor. Membrane 21 separates the water chamber 11 and the valve 15. Water is vaporized at the interface of membrane 21 and the dry hydrogen inside the valve 15.

Examples of chemical hydrides are LiH, $LiAlH_4$, $NH_3$ $MgH_2$, and $LiBH_4$, but other hydrides used in conventional hydrogen generators are also intended for use in the present invention. The term "chemical hydride" is broadly intended to be any hydride capable of reacting with a liquid to produce hydrogen.

The alcohol may be methanol or ethanol or either of these alcohols diluted with some amount of distilled water. Pure methanol has a freezing point of −98° C. and pure ethanol has a freezing point of −114° C. Adding a quantity of distilled water, which freezes at 0° C., will raise the freezing point to any temperature between 0° C. and that of the pure alcohol.

The salt used to lower the freezing point of distilled water may be any salt that does not react with chemical hydrides. Examples are calcium chloride and magnesium chloride, although any salt that lowers the freezing point of distilled water and does not react with a chemical hydride is intended for use in the present invention. Calcium chloride reduces the freezing point of distilled water to −30° C. Magnesium chloride reduces the freezing point of distilled water to −15° C. It is preferred that the liquid used in the present invention have a freezing point at least at −15° C. and more preferably at least at −30° C.

One advantage of using a salt in distilled water is that while it will not react to produce hydrogen, it will remain in solution and maintain the lowered freezing point of the liquid. The use of an alcohol as the liquid to react with the chemical hydride will, as the alcohol is used up in the reaction, cause the freezing point to rise. However, since pure methanol, for example, has a freezing point so far below 0° C., namely −98° C., this is not a concern unless a lot of distilled water is also included in the reactant liquid.

While particular embodiments of the present invention have been illustrated and described, it is not intended to limit the invention, except as defined by the following claims.

The invention claimed is:

1. In a hydrogen generator system having a hydrogen generating reaction between water vapor from stored distilled water and a chemical hydride, the improvement comprising:
   said distilled water comprising a temperature lowering salt dissolved therein to provide a liquid having a freezing point less than 0° C. to produce a vapor for said reaction;
   whereby the hydrogen generating reaction continues to function at ambient temperatures below 0° C.

2. The system of claim 1, wherein said temperature lowering salt comprises calcium chloride or magnesium chloride.

3. The system of claim 1, wherein said liquid has a freezing point below −15° C.

4. The system of claim 1, wherein said liquid has a freezing point below −30° C.

5. A method of generating hydrogen comprising the steps of:
   charging a hydrogen generator with a chemical hydride;
   charging said generator with a liquid having a freezing point below 0° C., the liquid comprising water and a temperature lowering salt dissolved in the water; and
   reacting said chemical hydride and a vapor formed from said liquid to produce hydrogen when said liquid is stored at ambient temperatures lower than 9° C.

6. The method of claim 5, wherein said temperature lowering salt comprises calcium chloride or magnesium chloride.

7. The method of claim 5, wherein said liquid has a freezing point below −15° C.

8. The method of claim 5, wherein said liquid has a freezing point below −30° C.

9. A hydrogen generator system comprising:
   a reaction chamber;
   a chemical hydride reaction agent;
   a liquid having a freezing point less than 0° C. and capable of reacting with said chemical hydride when converted to vapor to produce hydrogen, the liquid comprising water and a temperature lowering salt dissolved in the water;
   whereby the hydrogen generating reaction continues to function when said liquid is stored at ambient temperatures below 0° C.

10. The system of claim 9, wherein said temperature lowering salt comprises calcium chloride or magnesium chloride.

11. The system of claim 9, wherein said liquid has a freezing point below −15° C.

12. The system of claim 9, wherein said liquid has a freezing point below −30° C.

* * * * *